US006684325B1

(12) United States Patent
Nihei

(10) Patent No.: US 6,684,325 B1
(45) Date of Patent: Jan. 27, 2004

(54) METHOD AND SYSTEM FOR AUTOMATICALLY SETTING AN OPERATIONAL MODE OF A COMPUTER DEVICE BASED ON RECEIVED OR DETECTED ENVIRONMENTAL INFORMATION

(75) Inventor: Katsumi Nihei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/567,753

(22) Filed: May 10, 2000

(30) Foreign Application Priority Data

May 12, 1999 (JP) ............................................ 11-130718

(51) Int. Cl.⁷ .......................................... G06F 15/177
(52) U.S. Cl. .......................................... 713/1; 713/100
(58) Field of Search ............................... 713/1, 2, 100, 713/300, 310, 324, 330

(56) References Cited

U.S. PATENT DOCUMENTS

| 6,119,186 A | * | 9/2000 | Watts et al. ................. 710/104 |
| 6,175,918 B1 | * | 1/2001 | Shimizu ........................ 713/1 |
| 6,269,448 B1 | * | 7/2001 | Axenfeld ..................... 713/300 |
| 6,282,645 B1 | * | 8/2001 | Yamaki ....................... 713/100 |

FOREIGN PATENT DOCUMENTS

| JP | 4-84187 | 3/1992 |
| JP | 6-119265 | 4/1994 |
| JP | 6-187163 | 7/1994 |
| JP | 7-295845 | 11/1995 |
| JP | 7-319569 | 12/1995 |
| JP | 8-36485 | 2/1996 |
| JP | 10-94057 | 4/1998 |
| JP | 11-65996 | 3/1999 |

OTHER PUBLICATIONS

Copy of Japanese Office Action dated Aug. 26, 2003.

* cited by examiner

*Primary Examiner*—Dennis M. Butler
(74) *Attorney, Agent, or Firm*—Dickstein, Shapiro, Morin & Oshinsky, LLP.

(57) ABSTRACT

An operation mode setting method and system allowing a portable computer to be easily set to a suitable one of use environments is disclosed. The portable computer stores a plurality of operation modes corresponding respectively to different environments. Each of the operation modes permits a predetermined set of the resources suitable for a corresponding environment to be used. When receiving an environment identification signal from outside, an operation mode manager selects one of the operation modes depending on a received environment identification signal, and a program-controlled processor is set to a selected operation mode.

19 Claims, 3 Drawing Sheets

METHOD AND SYSTEM FOR AUTOMATICALLY SETTING AN OPERATIONAL MODE OF A COMPUTER DEVICE BASED ON RECEIVED OR DETECTED ENVIRONMENTAL INFORMATION

BACKGROUND OF THE INVENTION

1. Field of the Invention

The present invention generally relates to a system in which a portable information processing device is operable in different operation environments or system configurations, and in particular to an operation mode setting method and system for such a portable information processing device.

2. Description of the Related Art

Recently, a portable computer such as a notebook-type or handheld-type computer has various operation modes, which can be selectively set by its user operating a key or the like.

In Japanese Patent Application Unexamined Publication No. 7-319569, for example, a computer system using a hotkey to change the system operation environment or configuration has been disclosed.

In Japanese Patent Application Unexamined Publication No. 8-36485, a control method has been disclosed, by which an application program can be efficiently executed by a user changing operation environments.

Further, in Japanese Patent Application Unexamined Publication No. 11-65996, a network computer has been disclosed which is designed to switch its operation mode depending on whether it is connected to a network.

However, the above-described conventional techniques cannot easily cope with various operation environments. In other words, the portable computer cannot be easily set to an optimal one of the operation environments.

SUMMARY OF THE INVENTION

An object of the present invention is to provide an operation mode setting method and system allowing a portable information processing device to be easily set to a suitable one of use environments.

According to the present invention, in a system composed of a plurality of transmitters, each of which transmits an environment identification signal in a corresponding environment, and a portable information processing device. The portable information processing device includes: a plurality of resources; a memory for storing setting data of a plurality of operation modes corresponding respectively to different environments, wherein each of the operation modes permits a predetermined set of the resources suitable for a corresponding environment to be used; a receiver for receiving an environment identification signal from a transmitter; an operation mode manager for selecting one of the operation modes stored in the memory, depending on a received environment identification signal; and an operation mode changer for setting a program-controlled processor to a selected operation mode.

According to another aspect of the present invention, a method for setting a program-controlled processor to an operation mode in a portable information processing device, includes the steps of: a) storing setting data of a plurality of operation modes corresponding respectively to different environments, wherein each of the operation modes permits a predetermined set of the resources suitable for a corresponding environment to be used; b) receiving an environment identification signal from one of a plurality of transmitters which transmit environment identification signals each identifying a corresponding environment; c) selecting one of the operation modes stored in the memory, depending on a received environment identification signal; and d) setting a program-controlled processor to a selected operation mode.

According to further another aspect of the present invention, a method for setting a program-controlled processor to an operation mode in a portable information processing device, includes the steps of: a) storing setting data of a plurality of operation modes corresponding respectively to different environments, wherein each of the operation modes permits a predetermined set of the resources suitable for a corresponding environment to be used; b) determining whether an environment identification signal is received from one of a plurality of transmitters which transmit environment identification signals each identifying a corresponding environment; c) determining whether an environment is recognized without receiving any environment identification signal; d) in one of cases where an environment identification signal has been received and where an environment has been recognized, selecting one of the operation modes stored in the memory, depending on a corresponding one of a received environment identification signal a recognized environment; and e) setting a program-controlled processor to a selected operation mode.

A portable information processing device according to the present invention includes: a plurality of resources; a memory for storing setting data of a plurality of operation modes corresponding respectively to different environments, wherein each of the operation modes permits a predetermined set of the resources suitable for a corresponding environment to be used; a receiver for receiving an environment identification signal from outside; an operation mode manager for selecting one of the operation modes stored in the memory, depending on a received environment identification signal; and an operation mode changer for setting a program-controlled processor to a selected operation mode.

As described above, according to the present invention, a portable information processing device is allowed to automatically operate in an operation mode suitable for each environment. In other words, a well-used portable computer can be set to an operation mode suitable for each different environment to execute a desired application program. For example, in the office, the portable computer is set to an in-office operation mode which permits the keyboard and the monitor to work. In other words, the in-office operation mode is designed to provide the user with a combination of resources suitable for work in the office. In the case where the user rides in a car, the portable computer is set to an in-car operation mode which does not permit the keyboard and the monitor to work but a speech recognizer, for example, which allows the user to control the operation of the application program by voice. In other words, the in-car operation mode is designed to provide the user with a combination of resources suitable for work while driving the car.

DETAILED DESCRIPTION OF THE PREFERRED EMBODIMENT

Figure 1:
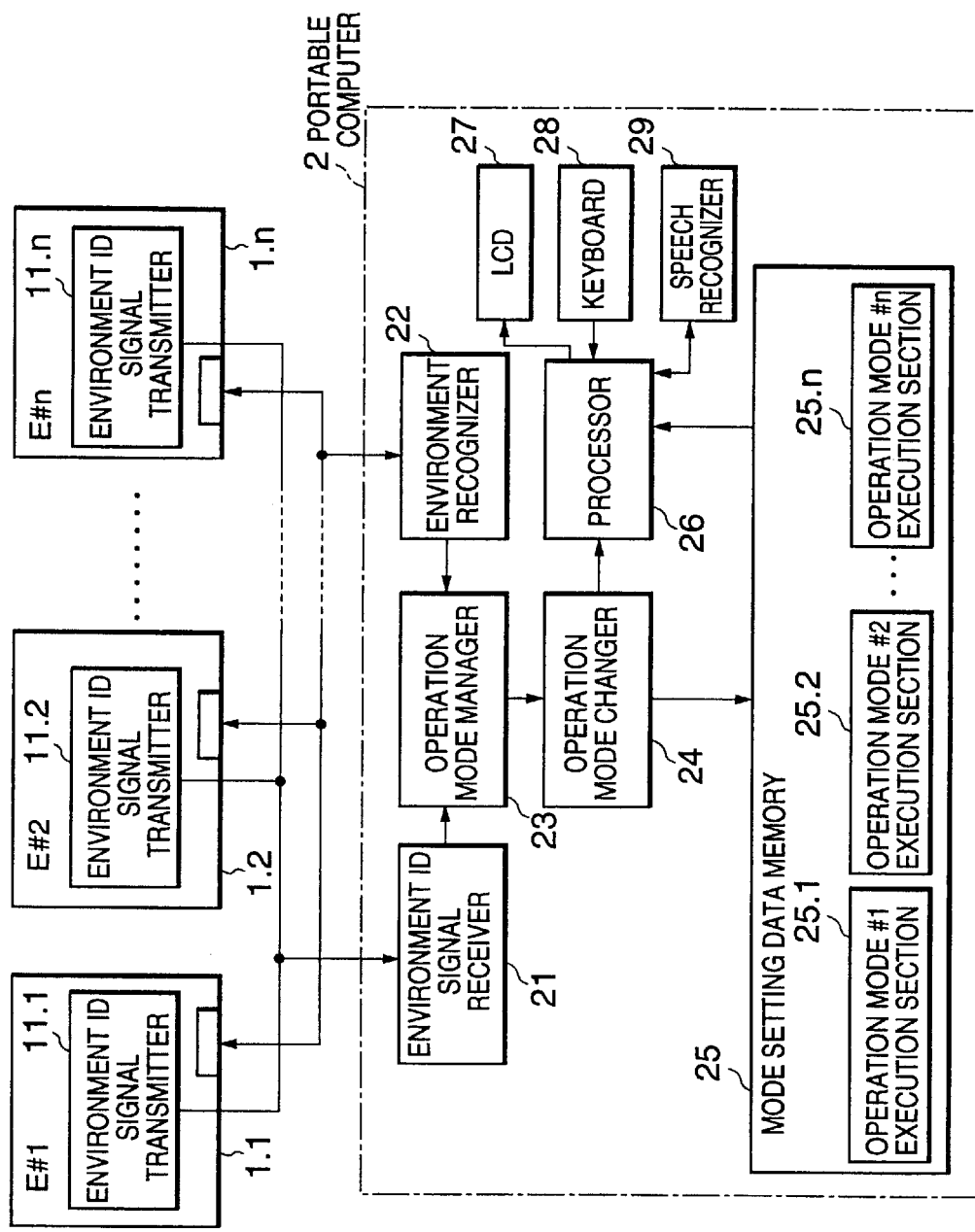
FIG. 1 is a block diagram showing an operation mode setting system according to an embodiment of the present invention.

As shown in FIG. 1, it is assumed for simplicity that a portable computer system is composed of a plurality of environments #1 to #n, which are denoted by reference numerals 1.1 through 1.n, respectively, and a portable computer 2 which is operable in each of the environments #1–#n. Here, an environment is defined as a use environment of the portable computer 2, for example, in the office, while walking, or in the car. More specifically, in the office, the portable computer 2 would be used on the desk by a user operating its keyboard while looking at its monitor. In contrast, in the car, the portable computer 2 is preferably used in voice command mode while the user drives the car. The portable computer 2 may be used while the user walking. The portable computer 2 according to the present invention can be operable in various use environments like these.

The respective environments #1–#n are provided with environment ID signal transmitters 11.1 to 11.n, which periodically broadcast environment ID signals each indicating the environments #1–#n. When moving into a certain environment, the portable computer 2 receives an environment ID signal from a corresponding environment ID signal transmitter and determines an operation mode thereof, which will be described later.

Figures 2, 3, 4:
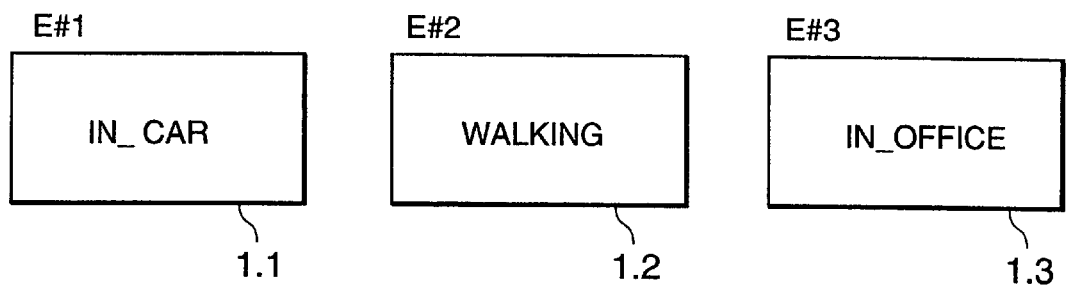
FIG. 2 is a diagram showing an example of operation environments in the operation mode setting system.
FIG. 3 is a diagram showing an example of environment identification signal table used in the embodiment.
FIG. 4 is a diagram showing an example of operation mode table used in the embodiment.

For example, in the case where the portable computer 2 is located in the office, the portable computer 2 may receive its environment ID signal through wireless LAN or wired LAN installed in the office. In a car mounted with an environment ID signal transmitter, the portable computer 2 receives its environment ID signal from the environment ID signal transmitter. In the case where the user carrying the portable computer 2 is walking outdoors, the portable computer 2 receives a broadcast signal as an environment ID signal from a radio base station of a mobile communication system such as Personal Digital Cellular (PDC) system or Personal Handy-phone System (PHS). These use environments are shown in FIG. 2.

The portable computer 2 is equipped with an environment ID signal receiver 21, an environment recognizer 22, an operation mode manager 23, and an operation mode changer 24. Further, the portable computer 2 has a mode setting data memory 25, which previously stores different operation mode execution sections denoted by reference numerals 25.1 to 25.n corresponding respectively to the environments #1–#n.

The environment ID signal receiver 21 receives an environment ID signal from one of the environment ID signal transmitters 11.1 to 11.n by wireless or wired communication means. When receiving an environment ID signal, the environment ID signal receiver 21 outputs the received environment ID data to the operation mode manager 23.

In addition to the environment ID signal receiver 21, the environment recognizer 22 may be provided in the personal computer 2. The environment recognizer 22 actively recognizes a current environment in which the portable computer 2 is located and outputs its identification data to the operation mode manager 23. For example, the environment recognizer 22 uses an image sensor such as a digital camera and an image processor to recognize the current environment. The image sensor and the image processor are provided in the portable computer 2. A captured image through the image sensor is processed by the image processor and a feature is extracted from the captured image. By matching the extracted feature with predetermined environment features, the current environment can be identified. The environment identification data is output to the operation mode manager 23. Alternatively, the distribution of temperature detected by infrared sensor, reflected supersonic or sound waves, or the like may be used as an input means for environment recognition.

When receiving the environment ID data from the environment ID signal receiver 21 or the environment identification data from the environment recognizer 22, the operation mode manager 23 identifies the current environment in which the portable computer 2 is located. If it is necessary to switch the operation mode, then the operation mode manager 23 instructs the operation mode changer 24 to select the mode data matching the current environment and then to shift the processing of a processor 26 to a corresponding execution section of the operation mode matching the current environment. In this manner, the operation mode execution sections 25.1 to 25.n are selectively operated without or with initializing the processor 26.

The respective operation mode execution sections 25.1 to 25.n cause the processor 26 to perform functions suitable for the environments #1–#n. Several examples will be described.

It is assumed that the portable computer 2 has a plurality of resources including a monitor 27 and a keyboard 28 and has an application program (here, an e-mail program) installed therein. In the case where the user sits at his/her desk in the office and operates the portable computer 2, the user can operate the keyboard 28 while seeing a window of the e-mail software displayed on the screen of the monitor 27. Therefore, in the office, the portable computer 2 is set to an in-office operation mode which permits the keyboard 27 and the monitor 28 to work. In other words, the in-office operation mode is designed to provide the user with a combination of resources suitable for work in the office.

In the case where the user rides in a car, the user should not use the keyboard 27 and the monitor 28 because they may shift the attention away from the safe operation of the car. Therefore, in the car, the portable computer 2 is set to an in-car operation mode which does not permit the keyboard 27 and the monitor 28 to work but a speech recognizer 29, which allows the user to control the operation of the e-mail software by voice. In other words, the in-car operation mode is designed to provide the user with a combination of resources suitable for work while driving the car.

The processor 26 is connected to a read-only memory (ROM) (not shown) which stores programs including the e-mail program. One or more program can run on the processor 26 according to the user's instruction and the processor 26 operates in a selected operation mode suitable for the current environment, which is selected as described above.

As shown in FIG. 3, the environment ID signal transmitters 11.1 to 11.n preferably have an environment ID table containing a one-to-one correspondence between environments and environment ID signals. Assuming that the environment ID signal transmitter 11.1 is installed in a car, the environment ID table of the environment ID signal transmitter 11.1 is set such that only a corresponding environment ID signal indicating ID=1 is transmitted. In the case where the environment ID signal transmitter 11.2 is installed in a radio base station of the mobile communications system, the environment ID table of the environment ID signal transmitter 11.2 is set such that only a corresponding environment ID signal indicating ID=2 is transmitted. In the case where the environment ID signal transmitter 11.3 is installed in an office, the environment ID table of the environment ID signal transmitter 11.3 is set such that only a corresponding environment ID signal indicating ID=3 is transmitted.

As shown in FIG. 4, the portable computer 2 has an operation mode table stored in the environment ID signal receiver 21 and the environment recognizer 22. When the environment ID signal receiver 21 has received the environment ID signal indicating ID=1, the environment ID=1 is output to the operation mode manager 23. Similarly, when the environment ID signal receiver 21 has received the environment ID signal indicating ID=2, the environment ID=2 is output to the operation mode manager 23 and, when the environment ID signal receiver 21 has received the environment ID signal indicating ID=3, the environment ID=3 is output to the operation mode manager 23.

On the other hand, when the environment recognizer 22 identifies a current environment as in_car, the environment recognizer 22 outputs the environment ID=1 to the operation mode manager 23. Similarly, when the environment recognizer 22 identifies a current environment as walking, the environment recognizer 22 outputs the environment ID=2 to the operation mode manager 23 and, when the environment recognizer 22 identifies a current environment as in_office, the environment recognizer 22 outputs the environment ID=3 to the operation mode manager 23.

The operation mode manager 23, when receiving an environment ID from the environment ID signal receiver 21 of the environment recognizer 22, controls the operation mode changer 24 depending on the received environment ID so that the optimal operation mode for the current environment is determined. The control operation of the operation mode manager 23 will be described hereafter.

Figure 5:
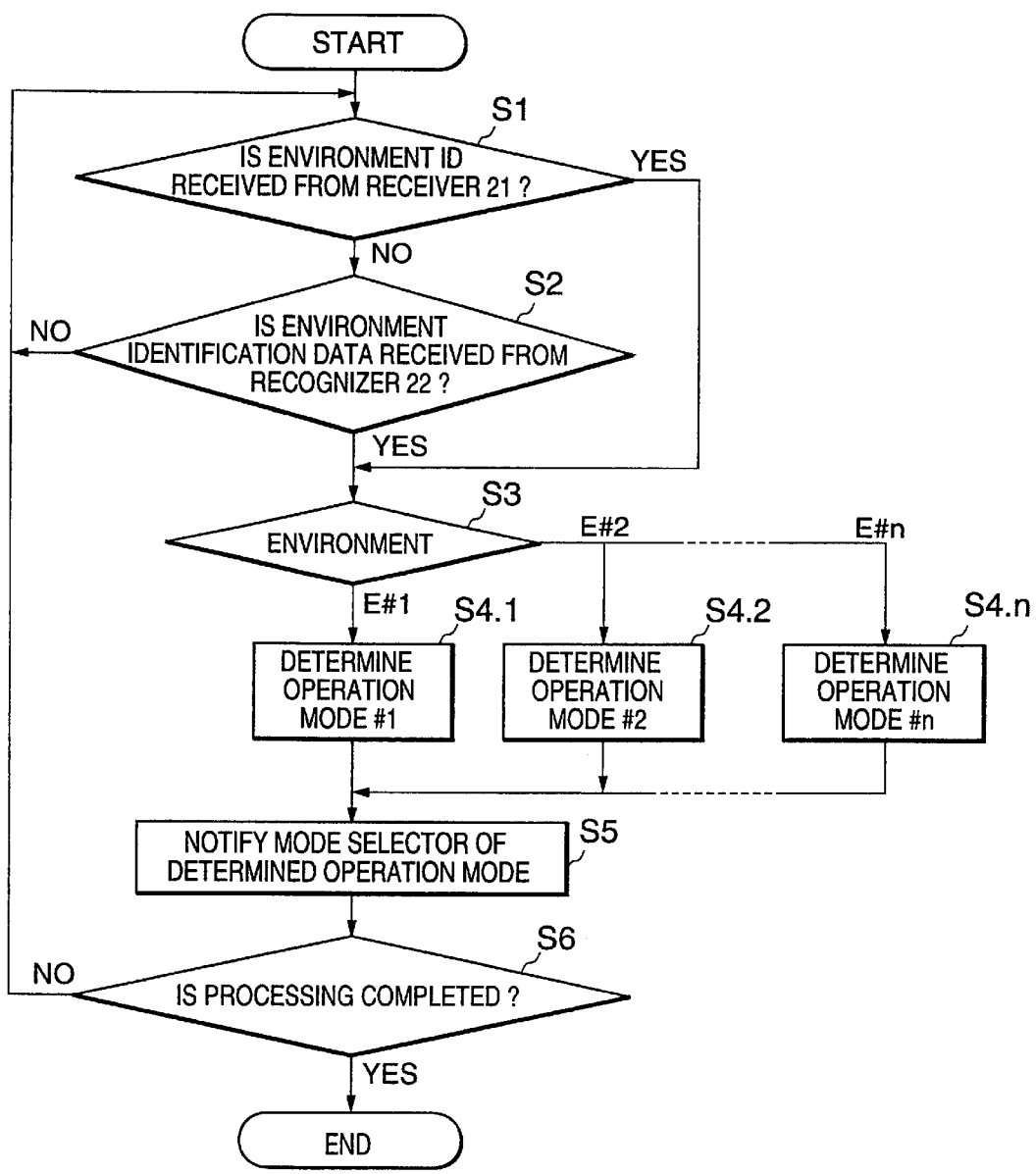
FIG. 5 is a flowchart showing an operation of an operation mode manager in the embodiment.

Referring to FIG. 5, the operation mode manager 23 determines whether an environment ID is received from the environment ID signal receiver 21 or the environment recognizer 22 (steps S1 and S2). When an environment ID has been received from either the environment ID signal receiver 21 or the environment recognizer 22 (YES at steps S1 or S2), the operation mode manager 23 determines one of the preset environments #1 –#n as the current environment according to the received environment ID (step S3).

When the current environment has been determined, the operation mode manager 23 determines an operation mode number corresponding to the current environment (a corresponding one of steps S4.1 to S4.n). The determined operation mode number is output to the operation mode changer 24 (step S5) and the steps S1–S5 are repeatedly performed until powered off (step S6).

The operation mode changer 24 selects one of the operation mode execution sections 25.1 to 25.n depending on the operation mode number determined by the operation mode manager 23. Therefore, the processor 26 is set to the operation mode suitable for the current environment. As described before, when the user operates the portable computer 2 in the office, for example, the portable computer 2 is set to an in-office operation mode that permits the keyboard 27 and the monitor 28 to work. When the user rides in a car, the portable computer 2 is set to an in-car operation mode which does not permit the keyboard 27 and the monitor 28 to work but a speech recognizer 29, which allows the user to control the operation of the e-mail software by voice.

What is claimed is:

1. A system comprising:
    a plurality of transmitters, each of which transmits an environment identification signal in a corresponding environment; and
    a portable information processing device comprising:
        a plurality of resources;
        a memory for storing setting data of a plurality of operation modes corresponding respectively to different environments, wherein each of the operation modes permits a predetermined set of the resources suitable for a corresponding environment to be used;
        a receiver for receiving an environment identification signal from a transmitter;
        an operation mode manager for selecting one of the operation modes stored in the memory, depending on a received environment identification signal; and
        an operation mode changer for setting a program-controlled processor to a selected operation mode.

2. The system according to claim 1, wherein each of the transmitters has a first table containing a correspondence between the environments and environment identification signals, wherein the transmitter transmits an environment identification signal indicating an environment of its own based on the first table.

3. The system according to claim 1, wherein the operation mode manager has a second table containing a correspondence between the environment identification signals and the operation modes.

4. The system according to claim 1, wherein each of the transmitters is a wireless transmitter and the receiver is a wireless receiver.

5. The system according to claim 1, wherein each of the transmitters is a wired transmitter and the receiver is a wired receiver.

6. The system according to claim 1, wherein the operation mode changer changes an operation mode of the program-controlled processor according to the selected operation mode without initializing the program-controlled processor.

7. The system according to claim 1, wherein the operation mode changer changes an operation mode of the program-controlled processor according to the selected operation mode after initializing the program-controlled processor.

8. The system according to claim 1, wherein the portable information processing device further comprises:
    an environment recognizer for recognizing an environment without receiving any environment identification signal.

9. A method for setting a program-controlled processor to an operation mode in a portable information processing device, comprising the steps of:
    a) storing setting data of a plurality of operation modes corresponding respectively to different environments, wherein each of the operation modes permits a predetermined set of the resources suitable for a corresponding environment to be used;
    b) receiving an environment identification signal from one of a plurality of transmitters which transmit environment identification signals each identifying a corresponding environment;
    c) selecting one of the operation modes stored in the memory, depending on a received environment identification signal; and d) setting a program-controlled processor to a selected operation mode.

10. The method according to claim 9, wherein each of the transmitters transmits an environment identification signal indicating an environment of its own based on a first table containing a correspondence between the environments and environment identification signals.

11. The method according to claim 9, wherein in the step (c), one of the operation modes stored is selected by referring to a second table containing a correspondence between the environment identification signals and the operation modes depending on a received environment identification signal.

12. The method according to claim 9, wherein in the step (b), an environment identification signal is received by wireless means.

13. The method according to claim 9, wherein in the step (b), an environment identification signal is received by wired means.

14. The method according to claim 9, wherein an operation mode of the program-controlled processor is changed according to the selected operation mode without initializing the program-controlled processor.

15. The method according to claim 9, wherein an operation mode of the program-controlled processor is changed according to the selected operation mode after initializing the program-controlled processor.

16. A method for setting a program-controlled processor to an operation mode in a portable information processing device, comprising the steps of:
   a) storing setting data of a plurality of operation modes corresponding respectively to different environments, wherein each of the operation modes permits a predetermined set of the resources suitable for a corresponding environment to be used;
   b) determining whether an environment identification signal is received from one of a plurality of transmitters which transmit environment identification signals each identifying a corresponding environment;
   c) determining whether an environment is recognized without receiving any environment identification signal;
   d) in one of cases where an environment identification signal has been received and where an environment has been recognized, selecting one of the operation modes stored in the memory, depending on a corresponding one of a received environment identification signal a recognized environment; and
   e) setting a program-controlled processor to a selected operation mode.

17. A storage medium storing a computer program for setting a program-controlled processor to an operation mode in a portable information processing device, the computer program comprising the steps of:
   a) storing setting data of a plurality of operation modes corresponding respectively to different environments, wherein each of the operation modes permits a predetermined set of the resources suitable for a corresponding environment to be used;
   b) receiving an environment identification signal from one of a plurality of transmitters which transmit environment identification signals each identifying a corresponding environment;
   c) selecting one of the operation modes stored in the memory, depending on a received environment identification signal; and
   d) setting a program-controlled processor to a selected operation mode.

18. A storage medium storing a computer program for setting a program-controlled processor to an operation mode in a portable information processing device, the computer program comprising the steps of:
   a) storing setting data of a plurality of operation modes corresponding respectively to different environments, wherein each of the operation modes permits a predetermined set of the resources suitable for a corresponding environment to be used;
   b) determining whether an environment identification signal is received from one of a plurality of transmitters which transmit environment identification signals each identifying a corresponding environment;
   c) determining whether an environment is recognized without receiving any environment identification signal;
   d) in one of cases where an environment identification signal has been received and where an environment has been recognized, selecting one of the operation modes stored in the memory, depending on a corresponding one of a received environment identification signal a recognized environment; and
   e) setting a program-controlled processor to a selected operation mode.

19. A portable information processing device comprising:
   a plurality of resources;
   a memory for storing setting data of a plurality of operation modes corresponding respectively to different environments, wherein each of the operation modes permits a predetermined set of the resources suitable for a corresponding environment to be used;
   a receiver for receiving an environment identification signal from outside;
   an operation mode manager for selecting one of the operation modes stored in the memory, depending on a received environment identification signal; and
   an operation mode changer for setting a program-controlled processor to a selected operation mode.

* * * * *